United States Patent [19]

Schemel et al.

[11] Patent Number: 4,539,186

[45] Date of Patent: Sep. 3, 1985

[54] METHOD FOR LEACHING AND RECOVERING VANADIUM FROM VANADIUM BEARING BY-PRODUCT MATERIALS

[75] Inventors: Roberto Schemel; Domingo Rodriguez; Ramon Salazar, all of Caracas, Venezuela

[73] Assignee: Intevep, S.A., Caracas, Venezuela

[21] Appl. No.: 589,951

[22] Filed: Mar. 15, 1984

[51] Int. Cl.³ .................... C01G 31/00; C01G 53/04
[52] U.S. Cl. .................................. 423/62; 423/65; 423/66; 423/140; 423/150
[58] Field of Search ............ 423/62, 65, 68, 140, 423/66

[56] References Cited

U.S. PATENT DOCUMENTS

| 828,850 | 8/1906 | Haynes et al. | 423/65 |
| 1,430,864 | 10/1922 | Thews | 423/65 |
| 4,039,582 | 8/1977 | Nasyrov et al. | 423/65 |

FOREIGN PATENT DOCUMENTS

| 54-114412 | 6/1979 | Japan | 423/68 |
| 1167829 | 10/1969 | United Kingdom | 423/68 |

Primary Examiner—H. T. Carter
Attorney, Agent, or Firm—Bachman & LaPointe

[57] ABSTRACT

A method for the removal and recovery of vanadium from a vanadium bearing material by leaching the vanadium bearing material in the presence of a leach promoter and removing the vanadium so leached from the leaching solution by precipitation. The leaching promoter forces the vanadium present in the vanadium bearing material into solution.

28 Claims, 1 Drawing Figure

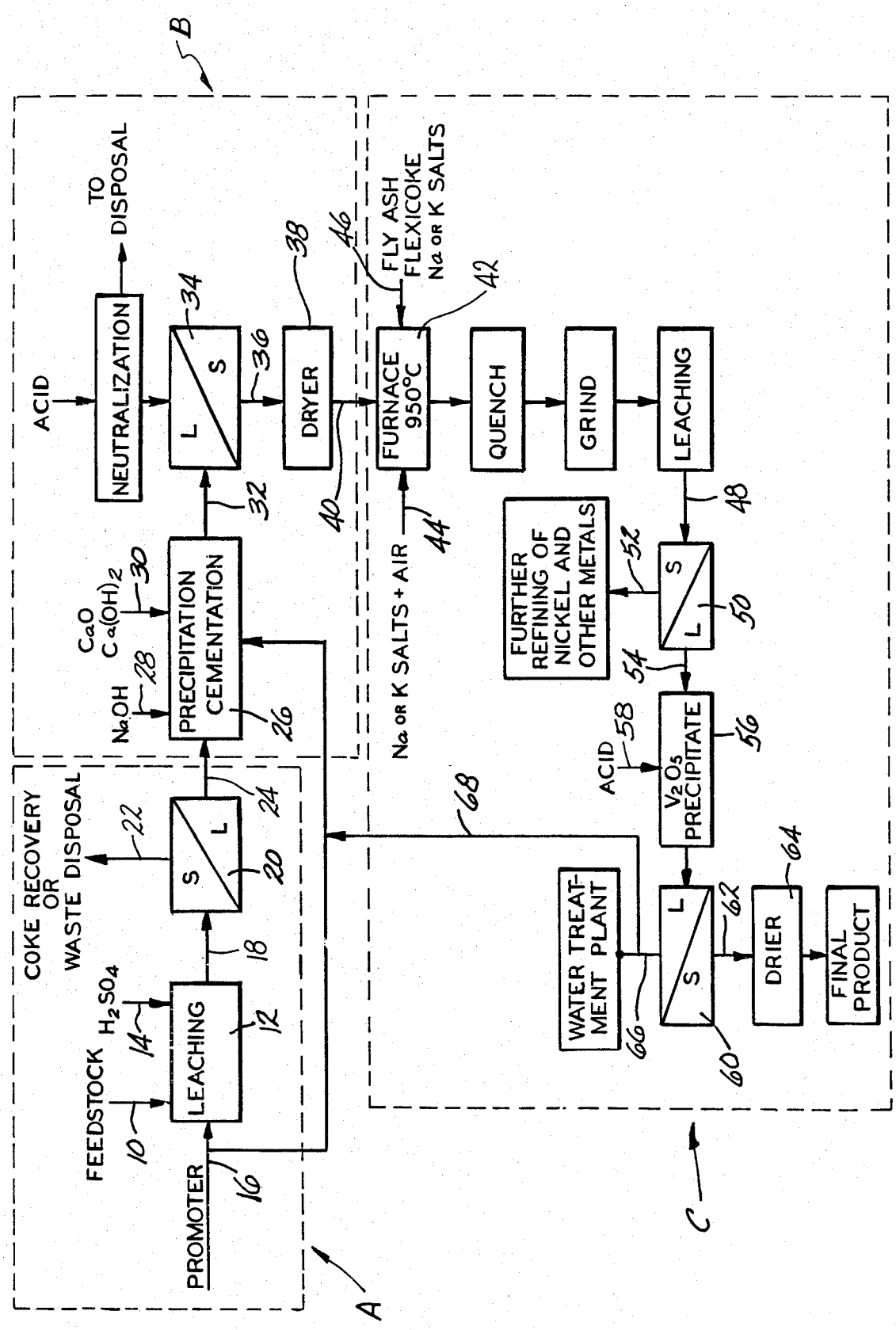

METHOD FOR LEACHING AND RECOVERING VANADIUM FROM VANADIUM BEARING BY-PRODUCT MATERIALS

BACKGROUND OF THE INVENTION

The present invention relates to a method of removing vanadium and concentrations of other metals from carbonaceous vanadium bearing materials and, more particularly, a method for the removal and recovery of vanadium by leaching the vanadium bearing material in the presence of a leach promoter and removing the vanadium so leached from the leaching solution.

Various commercial processes used in the petroleum industry as well as other industries generate by-products which contain rather high concentrations of vanadium and nickel in addition to smaller concentrations of other metals. In most cases the nature of the by-product is different, that is, the vanadium is present in different oxidation states depending on the particular by-product the vanadium is concentrated in. The by-products used as feedstock could be, for example, an acid liquor which contains up to 22 grams per liter of vanadium, solid rocks from vanadium fuel burning reactor power plants which contain up to 50% vanadium pentoxide ($V_2O_5$), fly ash collected from power plants which has a vanadium concentration of up to 4.17% vanadium, flexicoke from the gasification process which contains up to 12% vanadium as well as other sources.

Heretofore the removal of vanadium and concentrations of other metals such as nickel from vanadium bearing materials has been accomplished in a wide variety of processes. The recovery of vanadium from vanadium bearing feedstocks usually starts with a leaching step where the vanadium bearing material is treated in a caustic solution, usually sulfuric acid, to force the vanadium into solution. The foregoing step consists of the oxidation of vanadium cation species to the highest oxidation level, that is, its pentavalent state. After the vanadium has been oxidized in solution to its pentavalent state, it is precipitated by treating the leach liquor with a precipitating agent such as NaOH, ammonia ($NH_3$) or ammonium chloride so as to precipitate vanadium pentoxide ($V_2O_5$) and ammonium metavanadate $NH_4VO_3$, respectively. See for example Canadian Pat. No. 783,006. Leaching in a caustic solution of sulfuric acid as set forth above is inefficient when applied to carbonaceous type vanadium bearing materials, such as "coaly" ores, flexicoke, delayed coke and carbon contaminated ores containing organic matter up to 20% by weight because the vanadium does not readily go into solution due to the oxidation state of the vanadium and/or the fact that the vanadium is bonded to hydrocarbons. U.S. Pat. No. 3,840,637 discloses a process for recovering vanadium from ores having a high content of calcium carbonate wherein the ore is roasted and thereafter leached using an acid gas comprising sulfur dioxide. However, such a process is again ineffective when dealing with carbonaceous type vanadium bearing materials. Typical salt roast processes for the recovery of vanadium are disclosed in U.S. Pat. No. 3,733,193. Again, conventional salt roast processes for recovering vanadium have been generally unsuccessful when applied to carbonaceous type vanadium ores. U.S. Pat. No. 4,243,639 discloses a process for recovering vanadium from petroleum coke wherein the coke is gasified with steam in the presence of an alkali metal gasification catalyst to recover an inorganic ash containing vanadium and thereafter leaching the inorganic ash in water. The '639 process tends to be complicated and expensive and suffers from the further disadvantage that the petroleum coke is actually destroyed during the gasification process.

In light of the foregoing, it would be highly desirable to provide a method for removing and recovering vanadium from a wide range of vanadium bearing materials, in particular carbonaceous materials, in a simple and economical manner.

Accordingly, it is the principal object of the present invention to provide a method for recovering vanadium from a wide range of vanadium bearing materials.

It is a particular object of the present invention to provide a method for leaching vanadium from vanadium bearing materials.

It is a further object of the present invention to provide a method for leaching vanadium from vanadium bearing materials with a caustic solution in the presence of a leaching promoter.

It is a still further object of the present invention to provide a method for recovering vanadium from a carbonaceous type vanadium bearing material whereby the method is effected in a more advantageous economic manner.

Further objects and advantages of the present invention will appear hereinbelow.

SUMMARY OF THE INVENTION

In accordance with the present invention the foregoing objects and advantages are readily obtained.

The present invention relates to a method of removing vanadium and concentrations of other metals from carbonaceous vanadium bearing materials and, more particularly, a method for the removal and recovery of vanadium by leaching the vanadium bearing material in the presence of a leach promoter and removing the vanadium so leached from the leaching solution. The process can use as feedback a liquor containing vanadium and other metals in solution, a solid containing vanadium as an oxide, or a combination of the two sources. In accordance with the present invention, the leaching promoter forces the vanadium present in the vanadium bearing material into solution. The nature and the amounts of the leaching promoter will depend on the nature of the vanadium source and stoichiometry. For carbonaceous type vanadium bearing materials such as flexicoke and delayed coke where the vanadium is bonded to hydrocarbons and/or present in the trivalent oxidation state, the leaching promoter of the present invention is in the form of an ionic form of vanadium which, in an acid solution, is present in a valence state other than those vanadium species in the material to be leached. The difference in oxidation states between the vanadium species in the vanadium bearing material and the leaching promoter will force the system to reach an equilibrium thus creating a transfer of vanadium from the feed material to the liquid solution. Sodium hypochlorite (NaOCl) is also used as a leaching promoter for carbonaceous materials. Sodium hypochlorite oxidizes the surface of carbonaceous materials thus allowing the caustic acid media to wet the solid surface and allow leaching to take place. Finally, if the vanadium source is difficult to wet and contains various vanadium species of different oxidation states, a combination of NaOCl and vanadium species in solution are used to achieve optimum leaching.

After the leaching solution has been filtered, the invention calls for the precipitation of vanadium and nickel in a single step by increasing the pH of the solution to about 6 so as to precipitate vanadium in the trivalent and tetravalent state. By increasing the pH to about 9 nickel can be precipitated. The precipitate contains all the elements needed for an efficient salt roasting refining step where sodium metavanadate is formed. The other valuable metals can be filtered out once sodium metavanadate goes in solution when washed in water.

BRIEF DESCRIPTION OF THE DRAWING

The FIGURE is a schematic illustration of the method of the present invention.

DETAILED DESCRIPTION

Referring to the drawing, the process of the present invention is illustrated and comprises three basic steps; a leaching step A, a precipitation step B and a refining step C. With reference to the leaching step A, the vanadium feedstock, which can comprise a single vanadium bearing material or a combination thereof, is charged through line 10 to a leaching zone 12. In leaching zone 12 the vanadium feedstock is contacted with a caustic solution which is charged through line 14 in the presence of a leaching promoter which is charged through line 16. The caustic solution may consist of various acidic solutions as for example hydrochloric acid, nitric acid, sulfuric acid and the like; however, sulfuric acid is preferred. The nature and amounts of the leaching promoter employed will depend on the nature of the vanadium feedstock and its vanadium concentrations in order for the promoter to force the vanadium into solution. Generally, the leaching promoter is an ionic form of vanadium which, in the caustic acid solution, is present in a valence state other than those vanadium species in the vanadium feedstock to be leached. Suitable forms are preferably vanadium pentoxide ($V_2O_5$) but also vanadium tetraoxide. The difference in the oxidation states of the vanadium leach promoter will force the system to reach an equilibrium thus forcing vanadium from the feedstock and into solution. If the feedstock is a carbonaceous type of vanadium material it has been found that oxidizing agents such as hypochlorites of Na, Ca and K, peroxides and chlorine dioxide are effective leaching promoters as they oxidize the surface of carbonaceous materials thus allowing the caustic acid solution to wet the solid surface thereby allowing for effective leaching. Finally, if the vanadium feedstock is difficult to wet and contains various vanadium species of different oxidation states a combination of the vanadium leach promoter with the oxidizing agent, such as NaOCl, has been found to be an effective leaching promoter.

The leaching of the vanadium bearing material is effected at a temperature in the range of from about 20° to 90° C., preferably 60° to 90° C. for a period of time which may range from about 1 to 4, preferably 1 to 2. Depending on the nature of the vanadium feedstock it has been found useful to agitate the solution in the leaching zone during the leaching procedure. This may be accomplished in any suitable manner known in the art such as stirring or the like. After the leaching operation is completed, the solution is passed through line 18 to separation zone 20 wherein the leached feedstock material is separated from the pregnant leach liquor and is, depending on the feedstock material, either recovered or disposed of via line 22. The pregnant leach liquor at this point generally has a pH of less than 1.0 and, depending on the material feedstock, a wide range of vanadium ranging from ppm to grams/liter of liquor. The pregnant leach liquor is passed through line 24 to precipitator 26 where, in accordance with the present invention, vanadium and nickel is precipitated in a single step, the vanadium being precipitated in its trivalent and tetravalent states. In the precipitator 26 the pregnant leach liquor is contacted with a precipitating agent such as preferably hydroxides of sodium (Na), potassium (K) and calcium (Ca) charged through line 28. In accordance with the preferred embodiment of the present invention sodium and potassium hydroxides are preferred because, firstly, calcium tends to contaminate the liquor and, secondly and more importantly, the presence of sodium and/or potassium is required as will be explained hereinbelow to form the reaction product in furnace 42. Since acid/basic reactions, which is the case of this step, are usually exothermic it is suggested to maintain the temperature of the reactor to room temperature or ideally 20° C. in order to improve the precipitation of the elements contained in solution by decreasing their solubility. The pH of the pregnant leach liquor in the precipitator is adjusted to a range of from about 5.5 to 6.5 and preferably 6.0 to 6.2. By adjusing the pH with sodium hydroxide or other precipitating agent the vanadium is precipitated in the trivalent and tetravalent states. After the pH is adjusted, the traces of vanadium remaining in solution are cemented by charging the precipitator via line 30 with calcium hydroxide, calcium oxide, or mixtures thereof. The pH of the solution in the precipitator 26 is then further adjusted with the precipitating agent charged through line 28 until the pH is about 8.5 to 9.5 and preferably about 9 so as to allow for any nickel in the leach liquor to precipitate. After precipitation the solution is withdrawn from precipitator 26 through line 32 to a separator 34 wherein the solution is filtered and the liquid effluent neutralized with an acid solution such as hydrochloric acid, sulfuric acid and/or nitric acid, hydrochloric acid being preferred. Tests performed in a laboratory indicate that this process precipitates the majority of vanadium and nickel in solution and the concentration of vanadium and nickel in the final effluent irregardless of the initial concentration of vanadium and nickel in the pregnant leach liquor is less than 6 ppm vanadium and less than 1 ppm nickel. Although not shown in illustration, it is known that if the concentrations of vanadium is higher than 6 ppm due to irreversible changes in operational conditions, more $Ca(OH)_2$ can be added (proportionally to vanadium concentrations) to the filtered liquor obtained from separator 34 to cement the excess vanadium present in the liquor. The precipitate is then transported via line 36 to drier 38 and from drier 38 is taken via line 40 to furnace 42. The temperature of the furnace 42 is maintained at a temperature of from about 500° C. to 100° C., preferably 750° C. to 1000° C. The furnace is lined with fused alumina refractory. Air is introduced into the furnace via line 44 at a rate depending on the size of the furnace and the carbon content of the feedstock, such that the vanadium present in the precipitate forms a reaction product and becomes a water soluble salt. Where hydroxides of sodium and potassium were used as the precipitating agents there is generally enough Na or K in the precipitate to form the reaction product. In the event Na or K are not present in the required amount or were not used as the precipitating agent then Na and K salts are added to the furnace along with the air. It should be noted that in addition to the precipitate being charged to furnace 42 via line 40 additional flexicoke or fly ash may be charged to the furnace via line 46 along with Na and K salts when necessary. The product from 46 is then quenched and the slag is ground and dissolved in hot water at a temperature of about 70° C. to 100° C. After dissolving the slag in water the vanadium will be in solution in its pentavalent state and the rest of the metals will be solids. The solution is then delivered via line 48 to separator 50 where the solution is filtered and the solids are removed via line 52 for further refining as desired. The liquid is then delivered to precipitator 56 via line 54 wherein the invention is precipitated in the form of pure vanadium pentoxide by simple adjustment of pH by a charge of acid solution such as hydrochloric acid or the like through line 58. The solution is then delivered to separator 60 where it is filtered and the solids are delivered via line 62 to a drier 64 and the liquid effluent which still contains a small amount of vanadium in solution may be removed via line 66 for further treatment. In addition, the vanadium containing solution may be returned via line 68 to line 16 as an addition to the leaching zone 12 as the leaching promoter or to precipitator 25 for further treatment.

It should be appreciated that the following examples are given for purposes of illustrating the process of the present invention and it is to be understood that these examples are not intended to limit the generally broad scope of the present invention in strict accordance therewith and that the amounts of the promoters and precipitating agents, temperature, etc. may vary from case to case depending on the feedstock employed.

EXAMPLE 1

A feedstock comprising 150 grams of flexicoke having a vanadium concentration of 15.52 wt.% was placed in a leaching zone. The flexicoke was contacted in the leaching zone with 1500 ml of a 20 wt.% solution of sulfuric acid and, in accordance with the present invention, 150 ml of a leaching promoter comprising a 8 wt.% solution of sodium hypochlorite (NaOCl). The temperature of the bath solution in the leaching zone was maintained at a temperature of 80° C. while the solution was agitated by stirring with a glass rod at a speed of about 225 rpm using a variable speed motor. After leaching in the above manner for approximately 4 hours the solution was filtered, washed, dried and the leached flexicoke was analyzed for vanadium content which was found to be 1251 rpm indicating that 99.2% of the vanadium was removed from the flexicoke during leaching with the leaching promoter sodium hypochlorite.

500 ml of the filtered pregnant leach liquor having a vanadium concentration of approximately 22 grams/liter and a nickel concentration of 2 grams/liter was transferred to a precipitator where the pH of the pregnant leach liquor solution was adjusted to 6.2 by the addition of a solution containing 40 wt.% sodium hydroxide (NaOH) so as to precipitate vanadium in its trivalent and tetravalent states. The temperature of the solution was maintained at room temperature. Once the pH of the solution was adjusted and the vanadium precipitated out the remaining traces of vanadium in the solution were cemented by adding 32 grams of calcium hydroxide Ca(OH)$_2$ to the solution and mixing the solution until the pH and potentiality of the solution were stable. The pH of the solution was then increased to 9.2 with further additions of the 40% by weight sodium hydroxide (NaOH) solution as to allow for the nickel in solution to precipitate. The solution was thereafter withdrawn from the precipitator and filtered and the liquid effluent was then neutralized with hydrochloric acid. The final vanadium concentration in the liquid effluent was less than 6 ppm and the nickel concentration was less than 1 ppm.

The precipitate obtained was then dried and placed in a furnace at a temperature of 950° C. for 4 hours in the presence of air. The resultant reactive product was thereafter quenched and ground and thereafter placed in hot water at a temperature of 90° C. wherein the vanadium goes into solution in a pentavalent state. The solution was thereafter filtered and the pH of the resultant liquid was adjusted to 2 by the addition of a hydrochloric acid solution wherein 90% of the resultant vanadium precipitated out as a read mud (vanadium pentoxide) which is then dried to produce the final product of vanadium pentoxide.

EXAMPLE 2

A feedstock comprising 150 grams of delayed coke having a vanadium concentration of 1055 ppm and a particle size of between 180 and 250 microns was placed in a leaching zone. The flexicoke was contacted in the leaching zone with 1500 ml of a 20wt.% solution of sulfuric acid. In accordance with the present invention a leaching promoter comprising a combination of 150 ml of an 8 wt.% solution of sodium hypochlorite (NaOCl) and 18 g of vanadium pentoxide (V$_2$O$_5$) were added to the leaching zone as follows. The sodium hypochlorite which acts as an oxidizing agent and improves the wetting properties of the delayed coke, was added to the leaching zone containing the delayed coke and sulfuric acid. After approximately ten minutes (to assure good contact between the coke and the hypochlorite) the vanadium pentoxide was added to the leaching zone. The vanadium pentoxide could also be added earlier by dissolving it in the sulfuric acid solution. The temperature of this bath solution in the leaching zone was maintained at a temperature of 80° C. while the solution was agitated by stirring with a glass rod at a speed of about 225 rpm using a variable speed motor. After leaching in the above manner for approximately 4 hours the solution was filtered, washed, dried and the leached flexicoke was analyzed for vanadium content which was found to be 640 ppm indicating that approximately 40% of the vanadium was removed from the flexicoke during leaching with the leaching promoter sodium hypochlorite in combination with vanadium pentoxide. It has been found that by using a smaller particle size of delayed coke vanadium removal and rate of leaching are both enhanced.

The resultant pregnant leach liquor may then be treated in the same manner as set forth above with regard to Example 1.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the removal and recovery of vanadium and nickel from vanadium-nickel bearing materials comprising the steps of providing a vanadium-nickel bearing feedstock; leaching said vanadium-nickel bearing feedstock with an acid solution having a leaching promoter in said acid solution wherein said leaching promoter is a material selected from the group consisting of an ionic form of vanadium, hypochlorites of sodium, calcium and potassium, peroxides, chlorine dioxide and mixtures thereof; separating the pregnant leach liquor from the leached feedstock material and adjusting said pregnant leach liquor with a precipitating agent to a pH in the range of from about 5.5 to 6.5 so as to precipitate vanadium in its trivalent and tetravalent states wherein said precipitating agent is a material selected from the group consisting of hydroxides of sodium, potassium, calcium and mixtures thereof; and further adjusting the pregnant leach liquor with said precipitating agent to a pH in the range of from about 8.5 to 9.5 so as to precipitate nickel oxide.

2. A process according to claim 1 in which said leaching is effected at a temperature in the range of from about 20° to 90° C.

3. A process according to claim 1 in which said leaching is effected at a temperature in the range of from about 60° to 90° C.

4. A process according to claim 1 including the steps of agitating said acid solution during the leaching procedure.

5. A process according to claim 1 further including the steps of separating and drying the precipitates from said solution and heating said dried precipitates in a furnace at a temperature of from about 500° C. to 1000° C. in the presence of air and salt so as to oxidize said vanadium precipitate to its pentavalent state so as to form a water soluble salt reaction product.

6. A process according to claim 5 wherein the temperature of the furnace is maintained at about 950° C.

7. A process according to claim 5 wherein said separated liquid effluent is neutralized with an acid solution.

8. A process according to claim 7 wherein said acid solution comprises hydrochloric acid.

9. A process according to claim 5 further including the step of dissolving said reaction product in water wherein vanadium goes into solution in its pentavalent state.

10. A process according to claim 9 further including the steps of filtering the solution and adjusting the pH of the resultant liquor to about 2 so as to precipitate out vanadium pentoxide.

11. A process according to claim 10 wherein said solution is adjusted with an acid solution.

12. A process according to claim 10 further including the steps of separating said precipitate from said resultant liquid solution and drying said precipitate so as to produce vanadium pentoxide.

13. A process according to claim 12 further including the steps of recycling said resultant liquor solution to said precipitating zone.

14. A process according to claim 12 further including the step of recycling said resultant liquid solution to said leaching zone as a leaching promoter.

15. A process according to claim 5 wherein said salt is selected from the group consisting of hydroxides of sodium, potassium, calcium and mixtures thereof.

16. A process according to claim 11 wherein said acid solution is hydrochloric acid.

17. A process according to claim 1 wherein said acid solution contains an acid selected from the group consisting of hydrochloric acid, nitric acid, sulfuric acid and mixtures thereof.

18. A process according to claim 17 wherein said caustic solution comprises a sulfuric acid solution.

19. A process according to claim 1 wherein said vanadium-nickel bearing feedstock is leached for about 1 to 4 hours.

20. A process according to claim 1 wherein said vanadium-nickel bearing feedstock is leached for about 1 to 2 hours.

21. A process according to claim 1 wherein said pH is adjusted to about 6.2.

22. A process according to claim 1 wherein said precipitating agent is sodium hydroxide.

23. A process according to claim 1 wherein said pH is adjusted to about 9.

24. A process according to claim 1 wherein said leaching promoter is sodium hypochlorite.

25. A process according to claim 1 wherein said leaching promoter is a combination of sodium hypochlorite and vanadium pentoxide.

26. A process according to claim 1 further including the steps of cementing the vanadium traces in solution by the addition of a cementing agent selected from the group consisting of calcium hydroxide, calcium oxide and mixtures thereof.

27. A process according to claim 26 wherein said cementing agent is calcium hydroxide.

28. A process according to claim 1 wherein said vanadium-nickel bearing feedstock is a material selected from the group consisting of flexicoke, fly ash and mixtures thereof.

* * * * *